(12) United States Patent
Wu et al.

(10) Patent No.: US 12,323,646 B2
(45) Date of Patent: *Jun. 3, 2025

(54) CUSTOM DATA INDICATING NOMINAL RANGE OF SAMPLES OF MEDIA CONTENT

(71) Applicant: Microsoft Technology Licensing, LLC, Redmond, WA (US)

(72) Inventors: Yongjun Wu, Bellevue, WA (US); Naveen Thumpudi, Redmond, WA (US); Shyam Sadhwani, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/384,059

(22) Filed: Oct. 26, 2023

(65) Prior Publication Data

US 2024/0098320 A1  Mar. 21, 2024

Related U.S. Application Data

(63) Continuation of application No. 17/394,696, filed on Aug. 5, 2021, now Pat. No. 11,838,568, which is a
(Continued)

(51) Int. Cl.
| | |
|---|---|
| *H04N 21/2383* | (2011.01) |
| *H04N 21/2343* | (2011.01) |
| *H04N 21/235* | (2011.01) |
| *H04N 21/438* | (2011.01) |
| *H04N 21/84* | (2011.01) |

(Continued)

(52) U.S. Cl.
CPC .. *H04N 21/2383* (2013.01); *H04N 21/234309* (2013.01); *H04N 21/2351* (2013.01); *H04N 21/4382* (2013.01); *H04N 21/84* (2013.01); *H04N 21/23614* (2013.01); *H04N 21/440218* (2013.01)

(58) Field of Classification Search
CPC ....... H04N 21/234309; H04N 21/2351; H04N 21/23614; H04N 21/2383; H04N 21/4382; H04N 21/440218; H04N 21/84
See application file for complete search history.

(56) References Cited

U.S. PATENT DOCUMENTS

| | | | | |
|---|---|---|---|---|
| 2002/0101456 A1* | 8/2002 | Matsuoka | ................ | H04N 1/60 715/848 |
| 2007/0217699 A1* | 9/2007 | Mahiar | .............. | H04N 19/1883 382/232 |
| 2011/0305277 A1* | 12/2011 | Fu | .......................... | H04N 19/44 348/E5.077 |

* cited by examiner

*Primary Examiner* — Md N Haque
(74) *Attorney, Agent, or Firm* — Klarquist Sparkman, LLP

(57) ABSTRACT

A media processing tool adds custom data to an elementary media bitstream or media container. The custom data indicates nominal range of samples of media content, but the meaning of the custom data is not defined in the codec format or media container format. For example, the custom data indicates the nominal range is full range or limited range. For playback, a media processing tool parses the custom data and determines an indication of media content type. A rendering engine performs color conversion operations whose logic changes based at least in part on the media content type. In this way, a codec format or media container format can in effect be extended to support full nominal range media content as well as limited nominal range media content, and hence preserve full or correct color fidelity, (Continued)

while maintaining backward compatibility and conformance with the codec format or media container format.

20 Claims, 11 Drawing Sheets

Related U.S. Application Data continuation of application No. 16/899,214, filed on Jun. 11, 2020, now Pat. No. 11,115,691, which is a continuation of application No. 16/100,519, filed on Aug. 10, 2018, now Pat. No. 10,715,847, which is a continuation of application No. 15/272,661, filed on Sep. 22, 2016, now Pat. No. 10,075,748, which is a continuation of application No. 13/853,919, filed on Mar. 29, 2013, now Pat. No. 9,521,438.

(51) Int. Cl.
*H04N 21/236* (2011.01)
*H04N 21/4402* (2011.01)

software 180 implementing one or more
innovations for processing custom data that
indicates nominal range of samples of media content

CUSTOM DATA INDICATING NOMINAL RANGE OF SAMPLES OF MEDIA CONTENT

CROSS REFERENCE TO RELATED APPLICATIONS

This application is a continuation of U.S. patent application Ser. No. 17/394,696, filed Aug. 5, 2021, which is a continuation of U.S. patent application Ser. No. 16/899,214, filed Jun. 11, 2020, now U.S. Pat. No. 11,115,691, which is a continuation of U.S. patent application Ser. No. 16/100,519, filed Aug. 10, 2018, now U.S. Pat. No. 10,715,847, which is a continuation of U.S. patent application Ser. No. 15/272,661, filed Sep. 22, 2016, now U.S. Pat. No. 10,075,748, which is a continuation of U.S. patent application Ser. No. 13/853,919, filed Mar. 29, 2013, now U.S. Pat. No. 9,521,438, the disclosure of which is hereby incorporated by reference.

BACKGROUND

A computer processes media information as a series of numbers representing that information. For example, a single number may represent the intensity of brightness or the intensity of a color component such as red, green or blue for each elementary small region of a picture, so that the digital representation of the picture consists of one or more arrays of such numbers. Each such number may be referred to as a sample. For a color image, it is conventional to use more than one sample to represent the color of each elemental region. The set of these samples for an elemental region may be referred to as a pixel. For example, one pixel may consist of three samples that represent the intensity of red, green and blue (or R, G and B) light.

Sample depth is a property normally measured in bits that indicates the range of numbers that can be used to represent a sample. When more values are possible for the sample, quality can be higher because the number can capture more subtle variations in intensity and/or a greater range of values. Nominal range (also called "color range") indicates the range of values used for a sample, within the available range for a sample depth. For example, for 8-bit samples with an available range of 0 . . . 255, the nominal range can be 16 . . . 235 for some purposes (such as media coding/decoding or conventional television display), 48 . . . 208 for some purposes, and 0 . . . 255 for other purposes (such as video editing or viewing on a newer display).

Between different stages of processing, samples may be converted between color spaces, scaled between nominal ranges, or subjected to other processing. For example, a video source such as a camera or screen capture module may provide video in a color space such as RGB with a nominal range of 0 . . . 255 per 8-bit sample. The samples may be converted to a YUV format with a nominal range of 16 . . . 235 per 8-bit sample. A YUV format includes a luma (or Y) component with sample values representing approximate brightness values as well as multiple chroma (or U and V) components with sample values representing color difference values.

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system. Over the last two decades, various video codec standards have been adopted, including the H.261, H.262 (MPEG-2 or ISO/IEC 13818-2), H.263, H.264 (ISO/IEC 14496-10) standards, the MPEG-1 (ISO/IEC 11172-2) and MPEG-4 Visual (ISO/IEC 14496-2) standards, the SMPTE 421M standard, and the emerging HEVC standard. A video codec standard typically defines options for the syntax of an encoded video bitstream, detailing parameters in the bitstream when particular features are used in encoding and decoding. In many cases, a video codec standard also provides details about the decoding operations a decoder should perform to achieve correct results in decoding.

In general, a media container format specifies how to organize encoded media content for a media stream or streams for storage, transmission, etc. Along with identifying information for the media content, a media container format can specify metadata about the media content, timing information and error correction information.

Some video codec formats and media container formats support only a single nominal range for video, such as 16 . . . 235 in YUV color space. A video source may provide video having the full nominal range of 0 . . . 255, however, rather than a limited range such as 16 . . . 235. If conversions between color spaces and nominal ranges are not handled correctly, the quality of video can suffer due to clipping of values or due to playback of "limited range" values mistaken as "full range" values. More generally, even if conversions between color spaces and nominal ranges are handled correctly, conversion from full nominal range to limited nominal range can hurt quality due to loss in color fidelity.

SUMMARY

In summary, innovations described herein provide ways to use custom data to indicate nominal range of samples of media content. For example, a codec format or media container format can in effect be extended to support full nominal range video content (as well as limited nominal range video content) and hence preserve full (or correct) color fidelity, while maintaining backward compatibility and conformance with the codec format or media container format.

According to a first set of innovations described herein, a media processing tool adds custom data to encoded media content then outputs the custom data and encoded media content. The custom data indicates nominal range of samples of the media content. For example, the custom data indicates the nominal range of samples is one of (a) full range characterized by values from 0 . . . $2^n-1$ for samples of bit depth n, and (b) a limited range characterized by values in a sub-range of the full range.

The media processing tool can add the custom data as one or more syntax elements in an elementary media bitstream that also includes syntax elements for the encoded media content, such that backward compatibility and conformance with format of the elementary media bitstream are maintained. For example, the one or more syntax elements for the custom data are added in the elementary media bitstream as entry point user data or as user data at some other level of bitstream syntax. For video content, the media processing tool can be a video encoder that also receives an indication of video content type provided by a video source, receives input video content provided by the video source, and produces an elementary video bitstream, where the user data is added during the producing based on the video content type.

Or, the media processing tool can add the custom data as one or more fields in a media container that also includes the encoded media content in an elementary media bitstream, such that backward compatibility and conformance with format of the media container are maintained. For example, the custom data is added in the media container as one or more fields of a metadata object. For video content, the media processing tool can be a container format sink tool that also receives an indication of video content type provided by a video source, receives the encoded video content provided by a video encoder and formats the encoded video content in the media container, where the metadata indicating the nominal range of samples is added during the formatting based on the video content type.

According to a second set of innovations described herein, a media processing tool receives custom data and encoded media content, then parses the custom data. The custom data indicates nominal range of samples of the media content. The media processing tool can determine and provide an indication of media content type based on results of the parsing. A rendering engine may then perform color conversion operations on the samples, where logic for the color conversion operations changes based at least in part on the media content type.

The custom data can be signaled as one or more syntax elements in an elementary media bitstream that also includes syntax elements for the encoded media content, where backward compatibility and conformance with format of the elementary media bitstream are maintained. For video content, the media processing tool can be a video decoder that processes an elementary video bitstream (where the one or more syntax elements for the custom data are parsed during the processing, and the processing further includes decoding the encoded video content) and provides reconstructed video content along with an indication of video content type.

Or, the custom data can be signaled as one or more fields in a media container that also includes the encoded media content in an elementary media bitstream, where backward compatibility and conformance with format of the media container are maintained. For example, the custom data is signaled in the media container as one or more fields of a metadata object. For video content, the media processing tool can be a container format source tool that processes the encoded video content in the media container (where the metadata indicating the nominal range of samples is parsed during the processing) and provides the encoded video content as the elementary video bitstream along with an indication of video content type.

The use of custom data indicating nominal range of samples of media content can be implemented as part of a method, as part of a computing system adapted to perform the method or as part of a tangible computer-readable media storing computer-executable instructions for causing a computing system to perform the method.

The foregoing and other objects, features, and advantages of the invention will become more apparent from the following detailed description, which proceeds with reference to the accompanying figures.

DETAILED DESCRIPTION

Figure 1:
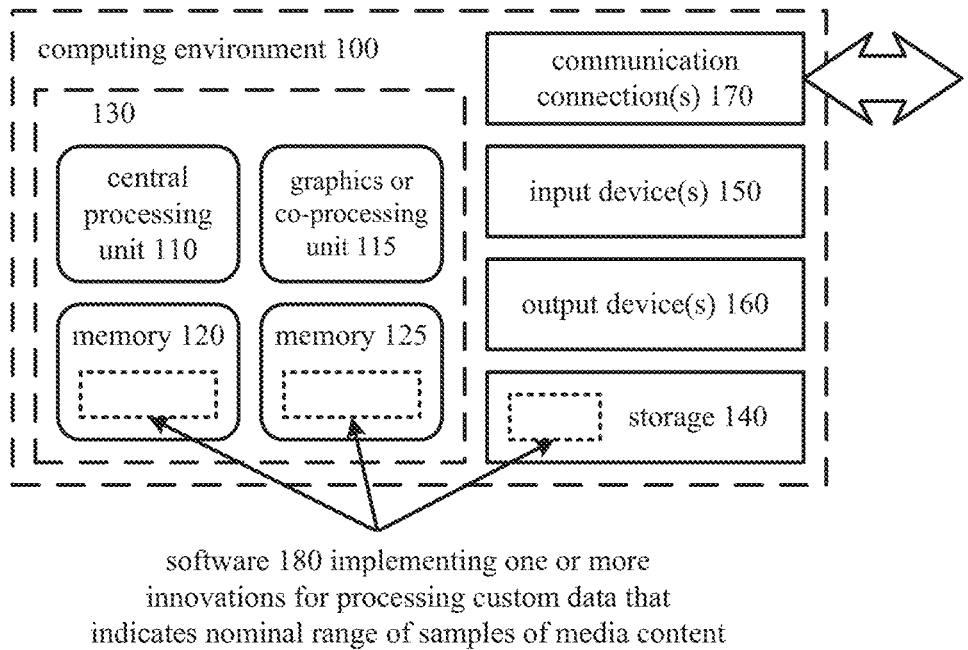
FIG. 1 is a diagram of an example computing system in which some described embodiments can be implemented.

The detailed description presents various approaches to using custom data that indicates nominal range of samples of media content. In particular, the detailed description presents innovations for effectively extending a codec format or media container format to support full nominal range video content as well as limited range video content. This can help preserve full or correct color fidelity, while maintaining backward compatibility and conformance with the codec format or media container format.

A video source such as a camera, animation output, screen capture module, etc. often provides video in a full range such as RGB 0 . . . 255. For encoding and decoding, however, in many cases the video is converted to YUV color space with a limited color range such as 16 . . . 235. Some video codec formats support only a single nominal range YUV 16 . . . 235 as the content type for input video and reconstructed video output. As for playback, many types of display units accept video for output in full nominal range. Conversion of full nominal range video content (from a video source) into a limited nominal range (for encoding and decoding), followed by conversion back to full nominal range (for output), can cause unnecessary loss in color fidelity. For example, fine-grained shades of gray may be lost.

In example implementations, a video source may provide video content with full nominal range such as RGB 0 . . . 255. The video content can be converted to a full range YUV format (such as YUV 0 . . . 255) for purposes of encoding and decoding. Or, the video content can be converted to a limited range YUV format (such as YUV 16 . . . 235 or YUV 48 . . . 208) for purposes of encoding and decoding. The video content is marked with custom data that indicates the nominal range of the video content, e.g., full range or one of various limited ranges. Depending on implementation, the custom data can be added to the elementary video bitstream or added to a media container, but the meaning of the custom data is not defined in the codec format or media container format. Regardless, the elementary video bitstream and media container are backward compatible with media processing tools (e.g., video encoders, media container sink tools, media container source tools, video decoders) that do not recognize the custom data that indicates nominal range.

Thus, the video codec format (or media container format) is effectively extended to support full nominal range video as well as video with various limited nominal ranges.

The innovations described herein can be applied for various color spaces and color ranges, including RGB and YUV color spaces with different nominal ranges. A YUV format includes a luma (or Y) component with sample values representing approximate brightness values as well as multiple chroma (or U and V) components with sample values representing color difference values. The precise definitions of the color difference values (and conversion operations between YUV color space and another color space such as RGB) depend on implementation. As used herein, the term YUV indicates any color space with a luma (or luminance) component and one or more chroma (or chrominance) components, including Y'UV, YIQ, Y'IQ and YDbDr as well as variations such as YCbCr and YCoCg. For RGB, YUV or another color space, the component signal measures that are used may be adjusted through the application of a non-linear transfer characteristics function (generally known as "gamma pre-compensation" and often denoted by the use of a prime symbol, although the prime symbol is often omitted for typographical convenience). Or, the component signal measures may be in a domain that has a linear relationship with light amplitude.

Although operations described herein are in places described as being performed by an encoder (e.g., video encoder), decoder (e.g., video decoder), container format sink tool or container format source tool, in many cases the operations can alternatively be performed by another type of media processing tool. Some examples described herein involve video content. More generally, the innovations described herein can be applied for image content (e.g., general still image content, medical scan content, multi-spectral imagery content) or another type of media content.

Some of the innovations described herein are illustrated with reference to syntax elements and operations specific to the SMPTE 421M (VC-1) standard. Innovations described herein can also be implemented for other codec standards or formats. Similarly, some of the innovations described herein are illustrated with reference to syntax elements and operations specific to the Advanced Systems Format ("ASF") specification. The innovations described herein can also be implemented for other media container formats.

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computing Systems.

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for processing custom data that indicates nominal range of samples of media content, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) (also called computer-readable storage) may be removable or non-removable, and includes magnetic disks, magnetic tapes or cassettes, CD-ROMs, DVDs, or any other medium which can be used to store information and which can be accessed within the computing system (100). The storage (140) stores instructions for the software (180) implementing one or more innovations for processing custom data that indicates nominal range of samples of media content.

The input device(s) (150) may be a touch input device such as a keyboard, mouse, pen, or trackball, a voice input device, touchscreen for receiving gesture input, a scanning device, or another device that provides input to the computing system (100). For video encoding, the input device(s) (150) may be a camera, video card, TV tuner card, or similar device that accepts video input in analog or digital form, or a CD-ROM or CD-RW that reads video samples into the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above.

The innovations can be described in the general context of computer-executable instructions (also called machine-readable instructions), such as those included in program modules (also called computer program product), being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit specially designed or configured to implement any of the disclosed methods (e.g., an ASIC such as an ASIC digital signal process unit, a graphics processing unit, or a programmable logic device such as a field programmable gate array).

For the sake of presentation, the detailed description uses terms like "determine," "provide" and "use" to describe computer operations in a computing system. These terms are high-level abstractions for operations performed by a computer, and should not be confused with acts performed by a human being. The actual computer operations corresponding to these terms vary depending on implementation. As used herein, the term "provided by" means any form of delivery, whether directly from an entity or indirectly from an entity through one or more intermediaries.

II. Example Network Environments.

Figure 2A:
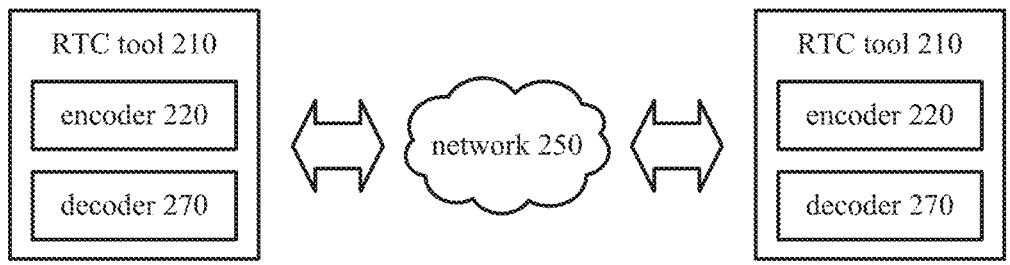
FIGS. 2*a* and 2*b* are diagrams of example network environments in which some described embodiments can be implemented.
Figure 2B:
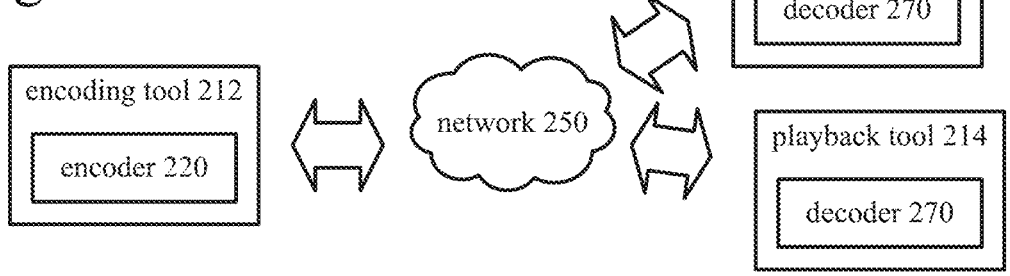

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with the SMPTE 421M standard, ISO/IEC 14496-10 standard (also known as H.264 or AVC), HEVC standard, another standard, or a proprietary format, with a corresponding decoder (270) accepting encoded data from the encoder (220). The bidirectional communication can be part of a video conference, video telephone call, or other two-party communication scenario. Although the network environment (201) in FIG. 2a includes two real-time communication tools (210), the network environment (201) can instead include three or more real-time communication tools (210) that participate in multi-party communication.

Figure 3:
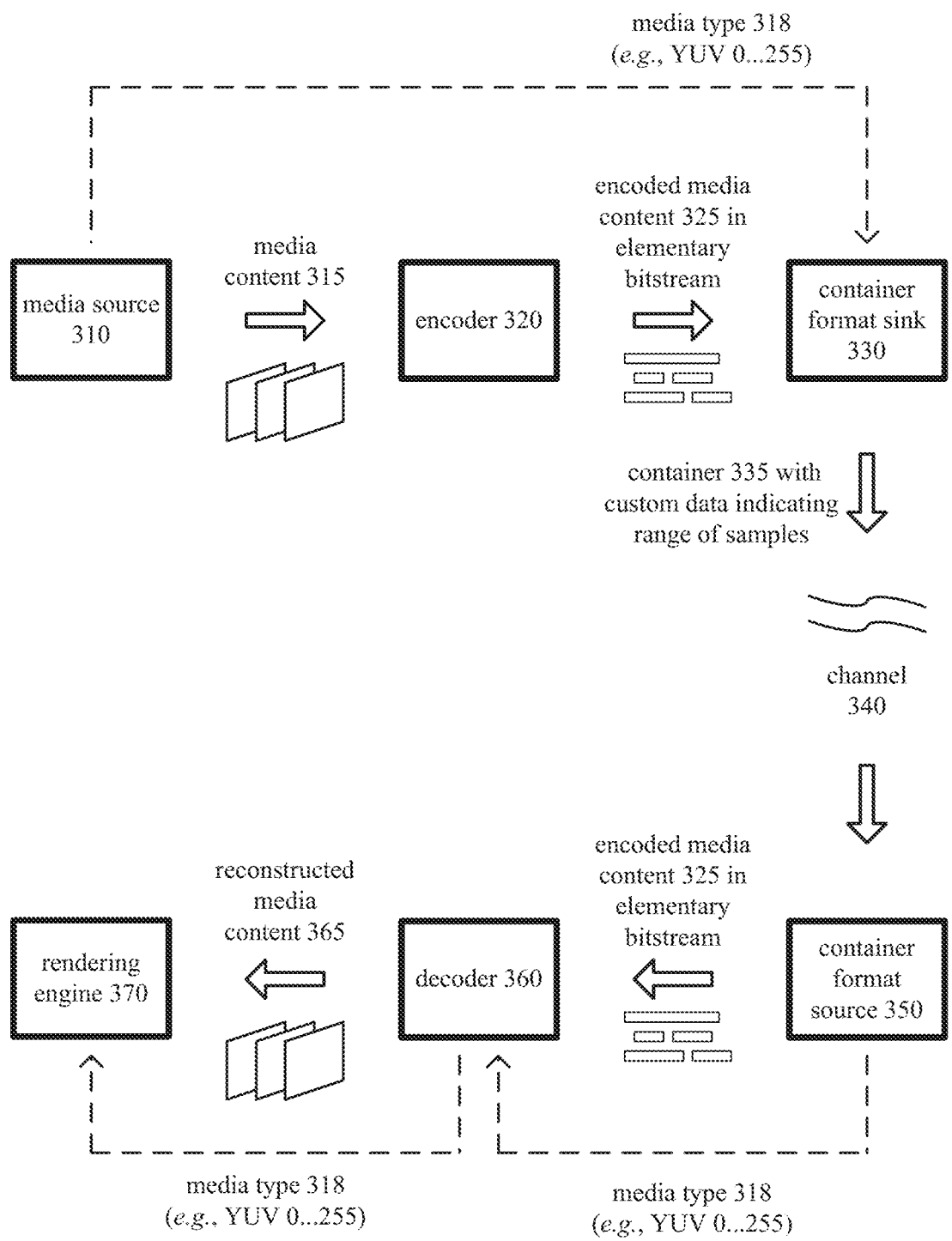
FIG. 3 is a diagram of a first example system in conjunction with which some described embodiments can be implemented.
Figure 6:
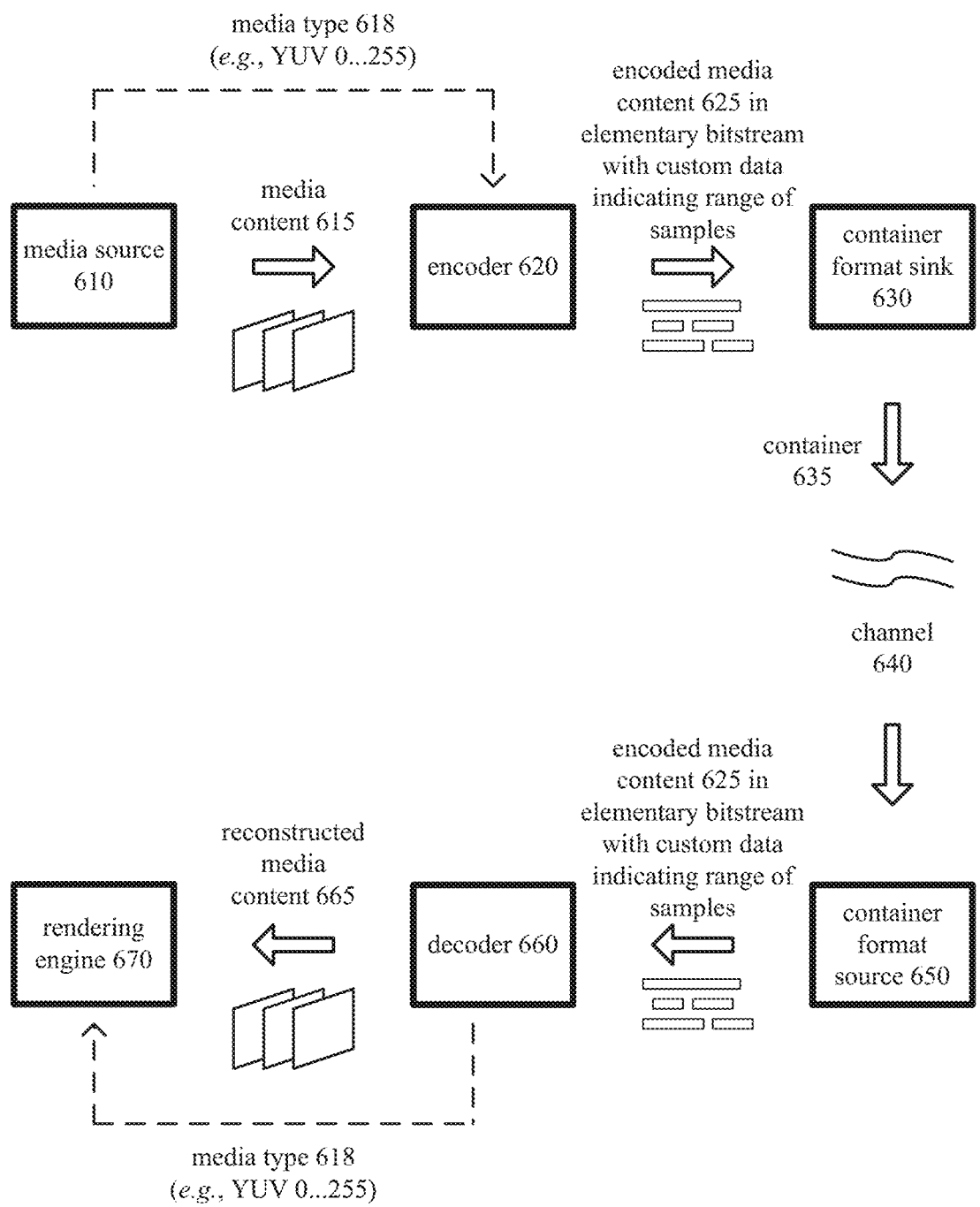
FIG. 6 is a diagram of a second example system in conjunction with which some described embodiments can be implemented.

A real-time communication tool (210) manages encoding by an encoder (220). FIGS. 3 and 6 show (in the top halves of the respective figures) example encoder systems that can be included in the real-time communication tool (210). Alternatively, the real-time communication tool (210) uses another encoder system. A real-time communication tool (210) also manages decoding by a decoder (270). FIGS. 3 and 6 also show (in the bottom halves of the respective figures) example decoder systems, which can be included in the real-time communication tool (210). Alternatively, the real-time communication tool (210) uses another decoder system.

In the network environment (202) shown in FIG. 2b, an encoding tool (212) includes an encoder (220) that encodes video for delivery to multiple playback tools (214), which include decoders (270). The unidirectional communication can be provided for a video surveillance system, web camera monitoring system, remote desktop conferencing presentation or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIGS. 3 and 6 show (in the top halves of the respective figures) example encoder systems that can be included in the encoding tool (212). Alternatively, the encoding tool (212) uses another encoder system. The encoding tool (212) can also include server-side controller logic for managing connections with one or more playback tools (214). FIGS. 3 and 6 also show (in the bottom halves of the respective figures) example decoder systems, which can be included in the playback tool (214). Alternatively, the playback tool (214) uses another decoder system. A playback tool (214) can also include client-side controller logic for managing connections with the encoding tool (212).

The network environment (201) shown in FIG. 2a can include multiple RTC tools with multiple encoders. The network environment (202) shown in FIG. 2b can include multiple encoding tools with multiple encoders. Such encoders can produce multiple output bitstreams that are spliced by a splicing tool into a single bitstream. Or, a single encoder can produce multiple bitstreams that are spliced by a splicing tool into a single bitstream.

III. Custom Data as Metadata in a Media Container.

FIG. 3 is a block diagram of an example system (300) in conjunction with which some described embodiments may be implemented. At the encoder side, the system (300) includes a media source (310), encoder (320) and container format sink (330). At the decoder side, the system (300) includes a container format source (350), decoder (360) and rendering engine (370).

The media source (310) provides media content (315). For video, the media source (310) can be a camera, tuner card, storage media, screen capture module, animation output or other digital video source. A video source typically produces a sequence of video frames. For progressive video, a frame is a progressive video frame. For interlaced video, in example embodiments, an interlaced video frame is de-interlaced prior to encoding. Alternatively, two complementary interlaced video fields are encoded as an interlaced video frame or separate fields. Aside from indicating a progressive video frame, the term "frame" or "picture" can indicate a single non-paired video field, a complementary pair of video fields, a video object plane that represents a video object at a given time, or a region of interest in a larger image. For image content, the media source (310) can be a graphics output, scanner, medical imaging tool or other digital image source. The media source (310) also reports the media type (318), which is provided to the container format sink (330). For example, the media type (318) can be YUV 0 . . . 255, YUV 16 . . . 235, YUV 48 . . . 208 or some other video content type.

Before the encoder (320), the system (300) can include a buffer for storing media content (315) as well as a pre-processor that performs pre-processing (e.g., filtering) of the media content (315) before encoding. The pre-processing can also include color space conversion, color range scaling and/or other processing.

The encoder (320) receives media content (315) provided by the media source (310) and produces encoded media content (325) in an elementary media bitstream as output to the container format sink (330). The encoder (320) can be a general-purpose encoding tool capable of operating in any of multiple encoding modes such as a low-latency encoding mode for real-time communication, transcoding mode, and regular encoding mode for media playback from a file or stream, or it can be a special-purpose encoding tool adapted for one such encoding mode. The encoder (320) can be implemented as an operating system module, as part of an application library, as a part of a standalone application or using special-purpose hardware.

Generally, the encoder (320) includes multiple encoding modules that perform encoding tasks such as prediction, frequency transforms, quantization and entropy coding. The exact operations performed by the encoder (320) can vary depending on codec format. For video, the format of the output encoded video content can be a Windows Media Video format, VC-1 format, MPEG-x format (e.g., MPEG-1, MPEG-2, or MPEG-4), H.26x format (e.g., H.261, H.262, H.263, H.264), HEVC format, VPx format or other format. In example implementations, the encoder (320) is a VC-1 encoder for the Simple, Main or Advanced profile. For images, the format of the output encoded image content can be a JPEG format, JPEG-XR format or other format. In example implementations, the operations of the encoder (320) do not change depending on the media type (318). For example, the operations of the encoder (320) are the same whether video content is YUV 48 . . . 208, YUV 16 . . . 235 or YUV 0 . . . 255.

The encoded media content (325) in the elementary media bitstream is aggregated and buffered in a temporary coded data area. The encoded media content (325) that is aggregated can include, as part of the syntax of the elementary media bitstream, media metadata relating to the encoded media content (325).

The container format sink (330) receives the encoded media content (325) in the elementary bitstream. The container format sink (330) organizes the encoded media content (325) in a media container (335) according to a container format such as ISO/IEC 14496-12. ASF, WebM or another container format. In example implementations, the container format sink (330) is an ASF sink. Depending on implementation, the container format sink (330) can packetize the encoded media content (325) for transmission as a media stream, in which case the container format sink (330) adds syntax elements as part of the syntax of the media transmission stream. Or, the container format sink (330) can organize the encoded media content (325) for storage as a file according to a media container format, in which case the container format sink (330) adds syntax elements as part of the syntax of the media storage file. Or, more generally, the container format sink (330) can implement one or more media system multiplexing protocols or transport protocols, in which case the container format sink (330) adds syntax elements as part of the syntax of the protocol(s). The container format sink (330) can be implemented as an operating system module, as part of an application library, as part of a standalone application or using special-purpose hardware.

The container format sink (330) also receives the media type (318). The container format sink (330) includes logic for processing the media type (318) and adding custom data in the media container (335) that indicates the nominal range for the media type (318). For example, the container format sink (330) adds custom data as a field in a metadata object or other object in the media container (335).

The container format sink (330) provides the media container (335) for output to a channel (340). For example, the media container (335) is an ASF file with encoded video content in an elementary video bitstream and metadata indicating nominal range of samples of the video content. The channel (340) represents storage, a communications connection (e.g., over the Internet), or another channel for the output.

The container format source (350) receives and processes the media container (335). The container format source (350) removes the encoded media content (325) that is organized in the media container (335) according to a container format such as ISO/IEC 14496-12, ASF, WebM or another container format. In example implementations, the container format source (350) is an ASF source. Depending on implementation, the container format source (350) can de-packetize encoded media content that has been aggregated for transmission as a media stream, in which case the container format source (350) parses syntax elements added as part of the syntax of the media transmission stream. Or, the container format source (350) can separate encoded media content that has been aggregated for storage as a file, in which case the container format source (350) parses syntax elements added as part of the syntax of the media storage file. Or, more generally, the container format source (350) can implement one or more media system demultiplexing protocols or transport protocols, in which case the container format source (350) parses syntax elements added as part of the syntax of the protocol(s). The container format source (350) can be implemented as an operating system module, as part of an application library, as part of a standalone application or using special-purpose hardware.

The container format source (350) includes logic for processing the custom data that indicates the nominal range for samples of the media content. The container format source (350) parses the custom data that is signaled in the media container (335) to indicate the nominal range for samples of the media content. For example, the container format source (350) parses custom data from a field in a metadata object or other object in the media container. The container format source (350) determines and outputs the media type (318) with the nominal range for samples of the media content.

The encoded media content (325) that is output from the container format source (350) is stored in a temporary coded data area until a sufficient quantity of such data has been received. The encoded media content (325) that is buffered can include, as part of the syntax of an elementary media bitstream, media metadata relating to the encoded media content (325).

The decoder (360) receives encoded media content (325) provided by the container format source (350) and produces reconstructed media content (365). The decoder (360) can be a general-purpose decoding tool capable of operating in any of multiple decoding modes such as a low-latency decoding mode for real-time communication and regular decoding mode for media playback from a file or stream, or it can be a special-purpose decoding tool adapted for one such decoding mode. The decoder (360) can be implemented as an operating system module, as part of an application library, as part of a standalone application, or using special-purpose hardware.

Generally, the decoder (360) includes multiple decoding modules that perform decoding tasks such as entropy decoding, inverse quantization, inverse frequency transforms and prediction. The exact operations performed by the decoder (360) can vary depending on codec format. For video, the format of the encoded video content can be a Windows Media Video format, VC-1 format, MPEG-x format (e.g., MPEG-1, MPEG-2, or MPEG-4), H.26x format (e.g., H.261, H.262, H.263, H.264), HEVC format, VPx format or other format. In example implementations, the decoder (360) is a VC-1 decoder for the Simple, Main or Advanced profile. For images, the format of the encoded image content can be a JPEG format, JPEG-XR format or other format. The decoder (360) passes the media type (318) provided by the container format source (350) to the rendering engine (370). In example implementations, the operations of the decoder (360) do not change depending on the media type (318). For example, the operations of the decoder (360) are the same whether video content is YUV 48 . . . 208, YUV 16 . . . 235 or YUV 0 . . . 255. Alternatively, the media type (318) is conveyed from the container format source (350) to the rendering engine (370) without involving the decoder (360).

A decoded frame temporary memory storage area can include multiple frame buffer storage areas for reconstructed media content (365). For example, the decoded frame temporary memory storage area buffers reconstructed frames of video in YUV 48 . . . 208, YUV 0 . . . 255 or YUV 16 . . . 235 format.

The rendering engine (370) processes the reconstructed media content (365) for output. The rendering engine (370) includes logic for processing the media type (318). In example implementations, the rendering engine (370) includes a color converter and display module. The color converter can convert reconstructed media content (365) from a format used in encoding/decoding (such as YUV 0 . . . 255, YUV 48 . . . 208 or YUV 16 . . . 235) into a format used for display (such as RGB 0 . . . 255). Depending on the media type (318) and output format, the color converter can use different logic to address different cases, for example, (1) YUV 0 . . . 255→RGB 0 . . . 255; (2) YUV 16 . . . 235→RGB 0 . . . 255; (3) YUV 0 . . . 255→RGB 16 . . . 235; and (4) YUV 16 . . . 235→RGB 16 . . . 235. The logic may be similar for these cases, e.g., using 3×3 matrix transform with different coefficients and/or different clipping operations. The color converter can include logic for other and/or additional cases. The color converter can also handle processing for a transfer function, color characteristics, etc.

Figure 4:
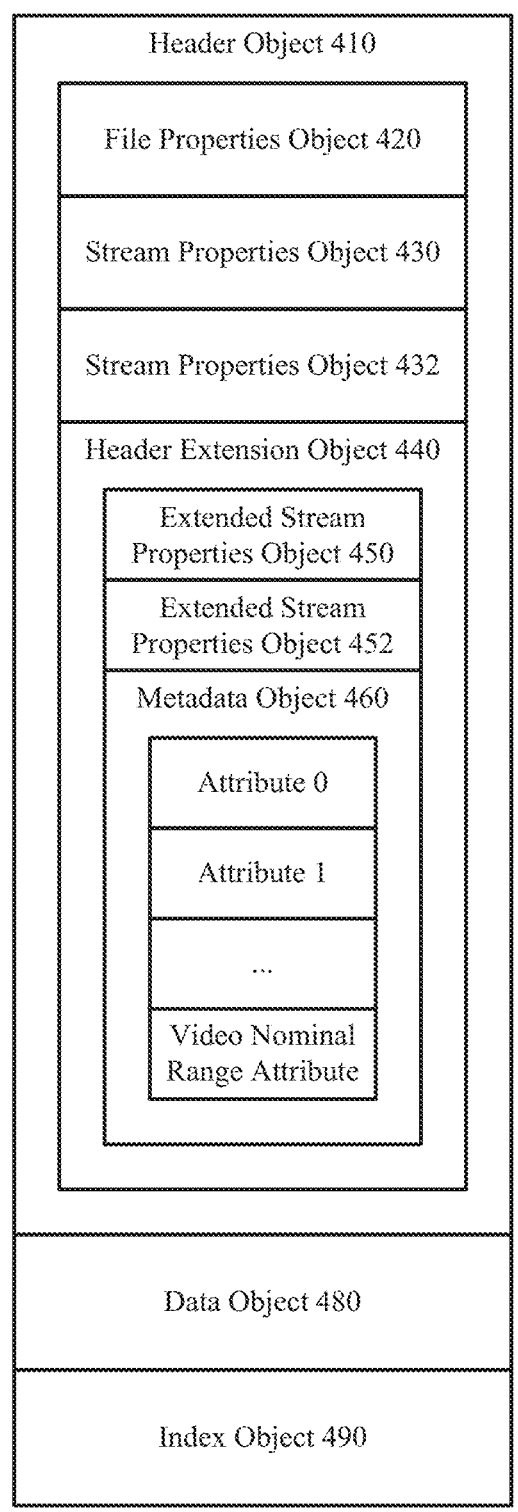
FIG. 4 is a diagram of a media container according to a media container format, in which a field includes metadata indicating nominal range of samples of video content.

FIG. 4 shows a media container (400) in which a field includes custom data indicating nominal range of samples of video content. At a high level, the container (400) includes a header object (410), data object (480) and index object (490). The header object (410) includes a file properties object (420), two stream properties objects (430, 432) and a header extension object (440). The header extension object (440) includes two extended stream properties objects (450, 452) and a metadata object (460), which has multiple attributes. One of the attributes (Video Nominal Range attribute) indicates whether the video nominal range is "Full" (e.g., YUV 0 . . . 255) or "Limited" (e.g., YUV 16 . . . 235, YUV 48 . . . 208). This can be a Boolean value or other data type. Alternatively, the Video Nominal Range attribute indicates other and/or additional nominal ranges (e.g., one of multiple possible limited nominal ranges).

The media container (400) shown in FIG. 4 can include other and/or additional objects. The metadata indicating nominal range of samples of video content can be placed at other locations in the media container (400). FIG. 4 is generally based on the ASF format. Alternatively, the media container (400) is organized according to another media container format.

Figure 5:
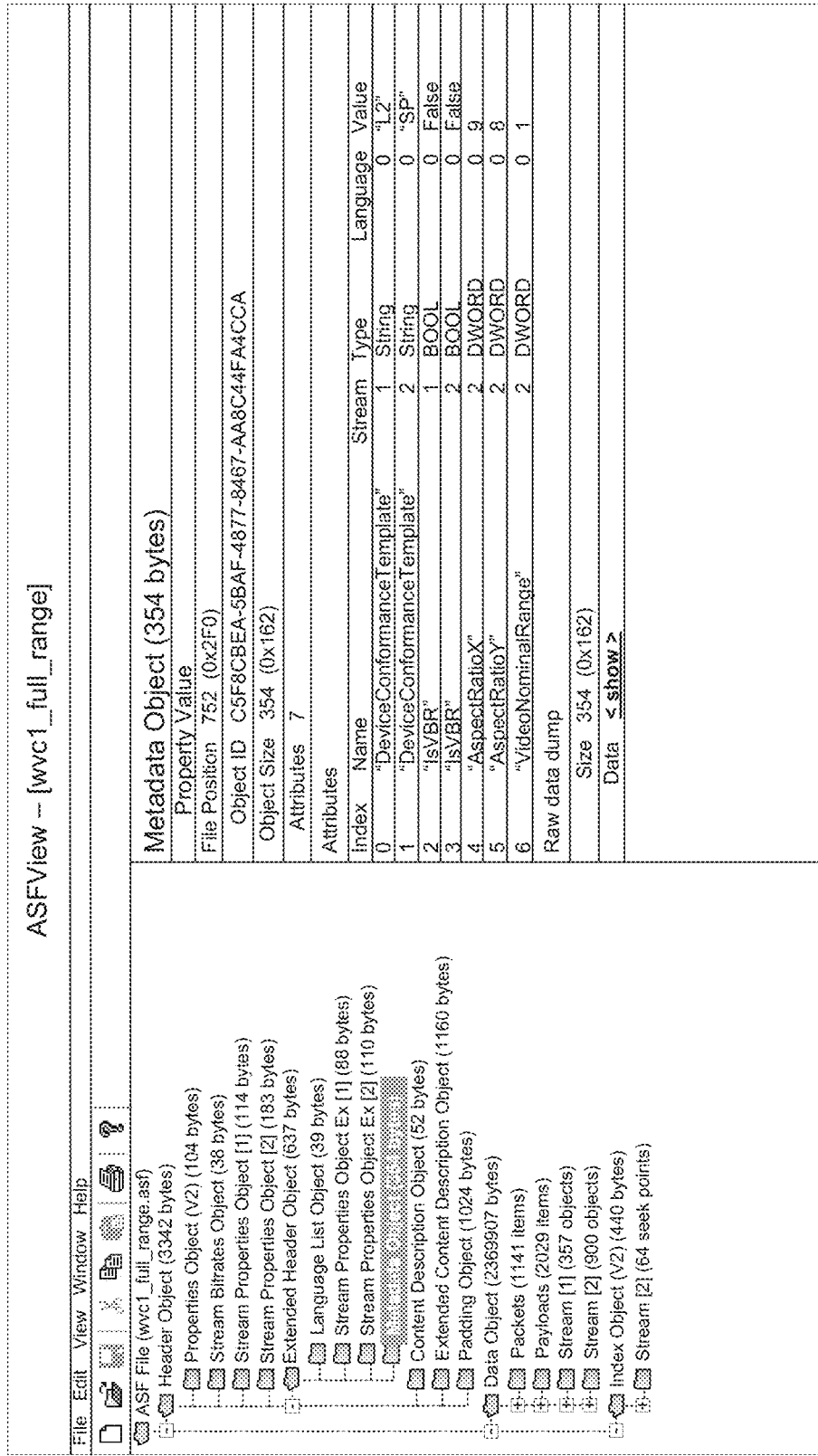
FIG. 5 is a chart illustrating a screen of a property explorer, in which a field of a metadata object of a media container indicates nominal range of samples of video content.

FIG. 5 shows another view (500) of a field that indicates nominal range of samples of video content in a metadata object of a media container organized according to the ASF format. Effectively, the ASF format has in effect been extended (through the use of custom data) to support full nominal range for samples of video content.

In FIG. 5, the attributes of the metadata object are detailed. The attributes include values of properties "DeviceConformanceTemplate" and "IsVBR" for two streams, as well as values of properties "AspectRatioX" and "AspectRatioY" for the second stream. The attribute "VideoNominalRange" indicates the nominal range of samples of video content for the second stream. The VideoNominalRange attribute has type DWORD and indicates whether the video nominal range is "Full" (e.g., YUV 0 . . . 255) or "Limited" (e.g., YUV 16 . . . 235, YUV 48 . . . 208), but can instead have another data type. Alternatively, the VideoNominalRange attribute indicates other and/or additional nominal ranges (e.g., one of multiple possible limited nominal ranges).

IV. Custom Data as User Data in an Elementary Media Bitstream.

FIG. 6 is a block diagram of an example system (600) in conjunction with which some described embodiments may be implemented. At the encoder side, the system (600) includes a media source (610), encoder (620) and container format sink (630). At the decoder side, the system (600) includes a container format source (650), decoder (660) and rendering engine (670).

The media source (610) provides media content (615). In doing so, the media source (610) generally operates like the media source (310) in the system (300) of FIG. 3. The implementation options described for the media source (310) of FIG. 3 also apply for the media source (610) of FIG. 6. The media source (610) also reports the media type (618), which is provided to the encoder (620). For example, the media type (618) can be YUV 0 . . . 255, YUV 16 . . . 235, YUV 48 . . . 208 or some other video content type.

Before the encoder (620), the system (600) can include a buffer for storing media content (615) as well as a pre-processor that performs pre-processing (e.g., filtering) of the media content (615) before encoding. The pre-processing can also include color space conversion, color range scaling and/or other processing.

The encoder (620) receives media content (615) provided by the media source (610) and produces encoded media content (625) in an elementary video bitstream as output to the container format sink (630). For purposes of encoding, the encoder (620) generally operates like the encoder (320) of FIG. 3. The implementation options described for the encoder (320) of FIG. 3 also apply for the encoder (620) of FIG. 6, except that, in example implementations, the encoder (620) is a VC-1 encoder for only the Advanced profile. As before, in example implementations, the core encoding operations of the encoder (620) do not change depending on the media type (618). For example, the core encoding operations of the encoder (620) are the same whether video content is YUV 48 . . . 208, YUV 16 . . . 235 or YUV 0 . . . 255. Unlike the encoder (320) of FIG. 3, however, the encoder (620) receives and processes the media type (618). The encoder (620) includes logic for processing the media type (618) and adding custom data in the elementary media bitstream that indicates a nominal range consistent with the media type (618). For example, the encoder (620) adds the custom data as entry point user data per entry point in an elementary video bitstream.

The encoded media content (625) in the elementary media bitstream (including user data indicating nominal range of samples) is buffered in a temporary coded data area. The encoded media content (625) that is aggregated can also include, as part of the syntax of the elementary media bitstream, media metadata relating to the encoded media content (625).

The container format sink (630) receives the encoded media content (625) in the elementary bitstream. The container format sink (630) organizes the encoded media content (625) in a media container (635) according to a container format such as ISO/IEC 14496-12, ASF, WebM or another container format. For purposes of formatting, the container format sink (630) generally operates like the container format sink (330) of FIG. 3. The implementation options described for the container format sink (330) of FIG. 3 also apply for the container format sink (630) of FIG. 6. Unlike the container format sink (330) of FIG. 3, however, the container format sink (630) of FIG. 6 does not include logic for processing the media type and adding custom data in the media container (635) that indicates nominal range.

The container format sink (630) provides the media container (635) for output to a channel (640). For example, the media container (635) is an ASF file with encoded video content and user data indicating nominal range of samples of the video content in an elementary video bitstream. The channel (640) represents storage, a communications connection (e.g., over the Internet), or another channel for the output.

The container format source (650) receives and processes the media container (635). The container format source (650) removes the encoded media content (625) that is organized in the media container (635) according to a container format such as ISO/IEC 14496-12, ASF, WebM or another container format. For purposes of formatting, the container format source (650) generally operates like the container format source (350) of FIG. 3. The implementation options described for the container format source (350) of FIG. 3 also apply for the container format source (650) of FIG. 6. Unlike the container format source (350) of FIG. 3, however, the container format source (650) in the system (600) does not include logic for processing custom data in the media container that indicates nominal range for samples of media content.

The encoded media content (625) in the elementary media bitstream (including user data indicating nominal range of samples) that is output from the container format source (650) is stored in a temporary coded data area until a sufficient quantity of such data has been received. The encoded media content (625) that is buffered can also include, as part of the syntax of the elementary media bitstream, media metadata relating to the encoded media content (625).

The decoder (660) receives encoded media content (625) provided by the container format source (650) and produces reconstructed media content (665). For purposes of decoding, the decoder (660) generally operates like the decoder (360) of FIG. 3. The implementation options described for the decoder (360) of FIG. 3 also apply for the decoder (660) of FIG. 6, except that, in example implementations, the decoder (660) is a VC-1 decoder for only the Advanced profile. As before, in example implementations, the core decoding operations of the decoder (660) do not change depending on the media type (618). For example, the core decoding operations of the decoder (660) are the same whether video content is YUV 48 . . . 208, YUV 16 . . . 235 or YUV 0 . . . 255. Unlike the decoder (360) of FIG. 3, however, the decoder (660) processes custom data that indicates nominal range of samples of media content. The decoder (660) includes logic for parsing user data in the elementary media bitstream that indicates the nominal range for samples of the media content, and determining the media type (618). For example, the decoder (660) parses such custom data signaled as entry point user data per entry point in an elementary video bitstream. The decoder (660) passes the media type (618) to the rendering engine (670).

A decoded frame temporary memory storage area can include multiple frame buffer storage areas for reconstructed media content (665). For example, the decoded frame temporary memory storage area buffers reconstructed frames of video in YUV 0 . . . 255, YUV 48 . . . 208 or YUV 16 . . . 235 format.

The rendering engine (670) processes the reconstructed media content (665) for output. The rendering engine (670) includes logic for processing the media type (618). The rendering engine (670) generally operates like the rendering engine (370) of FIG. 3. The implementation options described for the rendering engine (370) of FIG. 3 also apply for the rendering engine (670) of FIG. 6.

Figure 7:
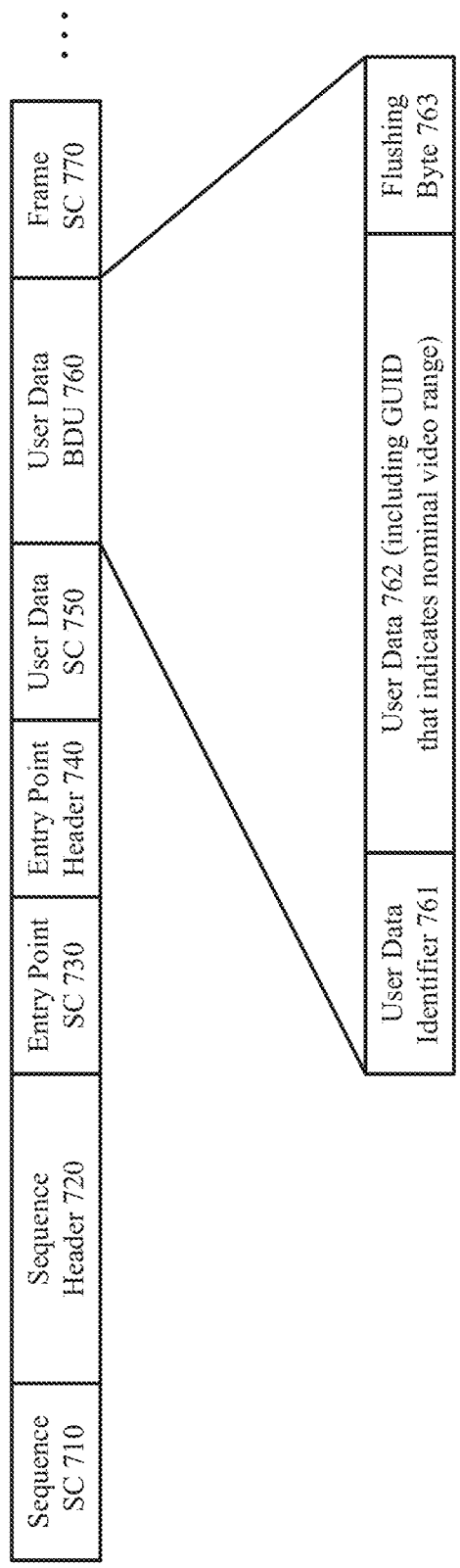
FIG. 7 is a diagram of a portion of an elementary video bitstream, in which entry point user data indicates nominal range of samples of video content.

FIG. 7 shows a portion (700) of an elementary video bitstream in which entry point user data indicates nominal range of samples of video content. The portion (700) of the bitstream includes a sequence start code (710), sequence header (720), entry point start code (730), entry point header (740), user data start code (750), user data bitstream data unit ("BDU") (760) and frame start code (770), followed by additional data units for frames, other entry points, etc. An entry point is a group of frames. The user data start code (750) marks the user data as entry point user data, which is consistent with the location of the user data in the bitstream. The user data BDU (760) includes a user data identifier (761), user data (762) and a flushing byte (763). The user data (762) can be a globally unique identifier ("GUID") that indicates the video nominal range is "Full" (e.g., YUV 0 . . . 255), but can instead have another data type. Alternatively, the user data (762) indicates other and/or additional nominal ranges.

The portion (700) of the bitstream shown in FIG. 7 can include other and/or additional data units. The user data indicating nominal range of samples of video content can be placed at other locations in the bitstream, e.g., as sequence-level user data or frame-level user data. FIG. 7 is generally based on the Advanced profile of the VC-1 standard. Alternatively, the bitstream is organized according to another codec format.

Figure 8:
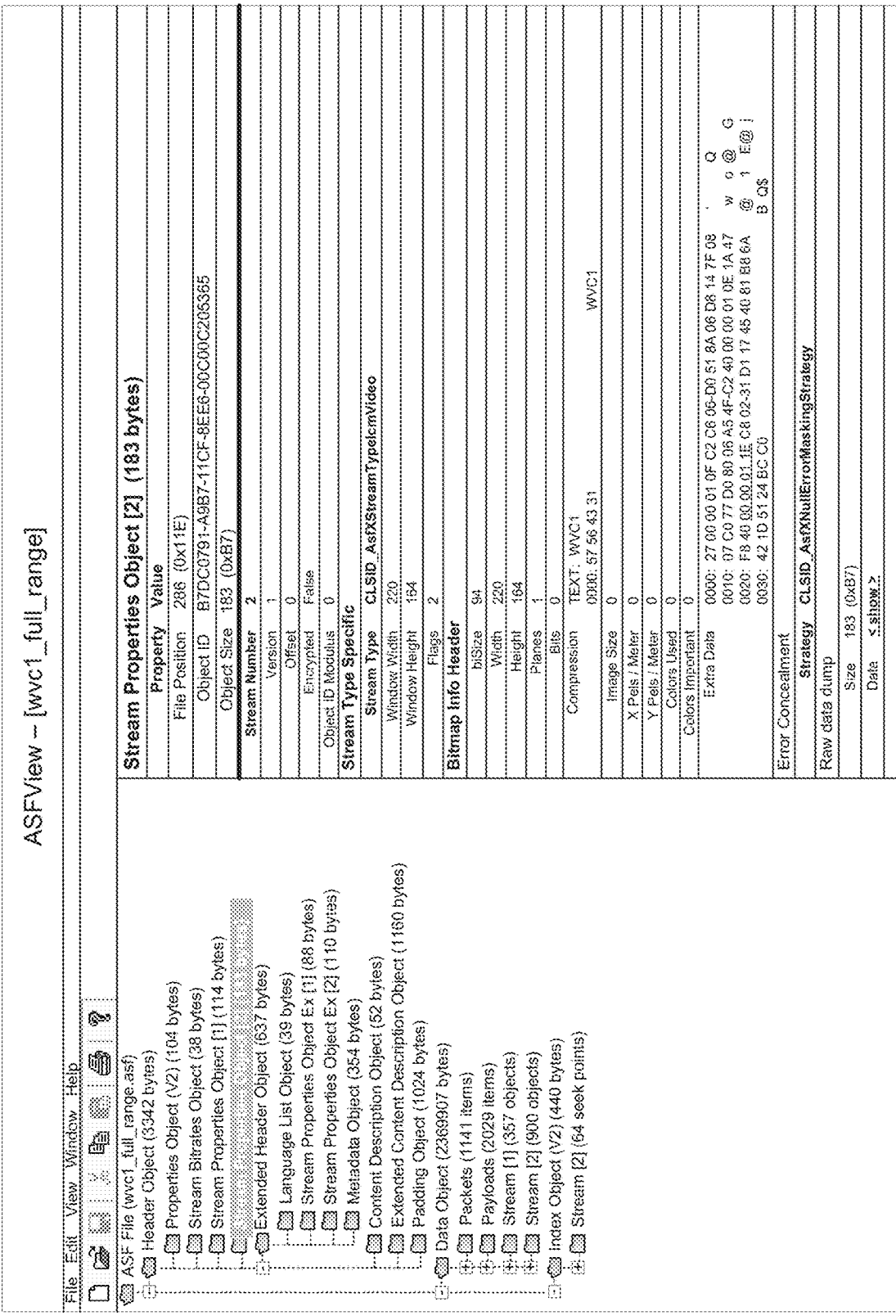
FIG. 8 is a chart illustrating a screen of a property explorer, in which entry point user data in an elementary video bitstream indicates nominal range of samples of video content.

FIG. 8 shows another view (800) of entry point user data that indicates nominal range of samples of video content in an elementary video bitstream organized according to the Advanced profile of the VC-1 standard. Effectively, the VC-1 format has in effect been extended (through the use of custom data) to support full nominal range for samples of video content. ASF is the container format for the VC-1 bitstream depicted in FIG. 8.

In FIG. 8, the attributes of a stream properties object are detailed. The "extra data" field includes values for a sequence header (following the sequence start code 0x00 00 01 0F), values of an entry point header (following the entry point start code 0x00 00 01 0E) and values for entry point user data (following the entry point user data start code 0x00 00 01 1E). In particular, the entry point user data includes the 16-byte GUID 0xC8 02 31 D1 17 45 40 81 B8 6A 42 1D 51 24 BC C0, which marks the frames of the entry point as having samples with full nominal range. In the absence of such entry point user data, as the default option the frames of the entry point are assumed to have samples with a pre-determined limited nominal range. Alternatively, the entry point user data is used to indicate other and/or additional nominal ranges. Since the user data indicating nominal range is signaled at entry point level, the nominal range can change from entry point to entry point. Alternatively, the user data indicating nominal range is signaled at sequence level, frame level or some other level of bitstream syntax.

The ASF container for the VC-1 bitstream illustrated in FIG. 8 can also include metadata indicating nominal range as a field of metadata in the ASF container. Such metadata in the ASF container is redundant, however, when entry point user data indicating video nominal range is signaled in the VC-1 bitstream. According to the Simple and Main profiles of VC-1 standard, however, encoded video content is not organized as BDUs, nor is user data signaled in the same way as part of the elementary video bitstream. Instead, custom data indicating video nominal range can be placed as metadata in the media container (e.g., ASF container), as described above with reference to FIGS. 3-5.

V. Techniques for Adding Custom Data that Indicates Nominal Range.

Figure 9:
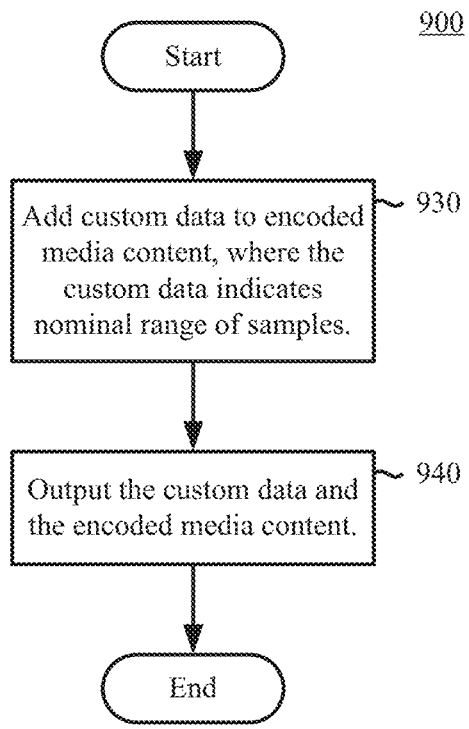
FIGS. 9-11 are flowcharts illustrating techniques for adding custom data that indicates nominal range of samples of media content such as video content.

FIG. 9 shows a generalized technique (900) for adding custom data that indicates nominal range of samples of media content. A media encoder or container format sink tool such as one described above with reference to FIG. 3 or 6, or other media processing tool, performs the technique (900).

The media processing tool adds (930) custom data to encoded media content. The custom data indicates nominal range of samples. For example, the custom data indicates the nominal range of samples is one of (a) full range characterized by values from $0 \ldots 2^n-1$ for samples of bit depth n, and (b) a limited range characterized by values in a sub-range of the full range. Alternatively, the custom data can expressly indicate the nominal range as end points of the range. Or, the custom data can indicate a selection among three, four, or more defined nominal ranges for the media content.

The custom data that indicates the nominal range of samples can be added as one or more syntax elements in an elementary media bitstream that also includes syntax elements for the encoded media content, such that backward compatibility and conformance with format of the elementary media bitstream are maintained. For example, the one or more syntax elements for the custom data are entry point user data or user data signaled at another level of bitstream syntax in the elementary media bitstream. In some implementations, the user data includes a GUID value that indicates the nominal range of samples. Alternatively, the user data is parameterized in another way.

Or, the custom data that indicates the nominal range of samples can be added as one or more fields in a media container that also includes the encoded media content, such that backward compatibility and conformance with format of the media container are maintained. For example, the custom data is added in the media container as one or more fields of a metadata object or other object.

The media processing tool outputs (940) the custom data and encoded media content. For example, the custom data and encoded media content can be output as part of elementary media bitstream or as part of a media container.

Figure 10:
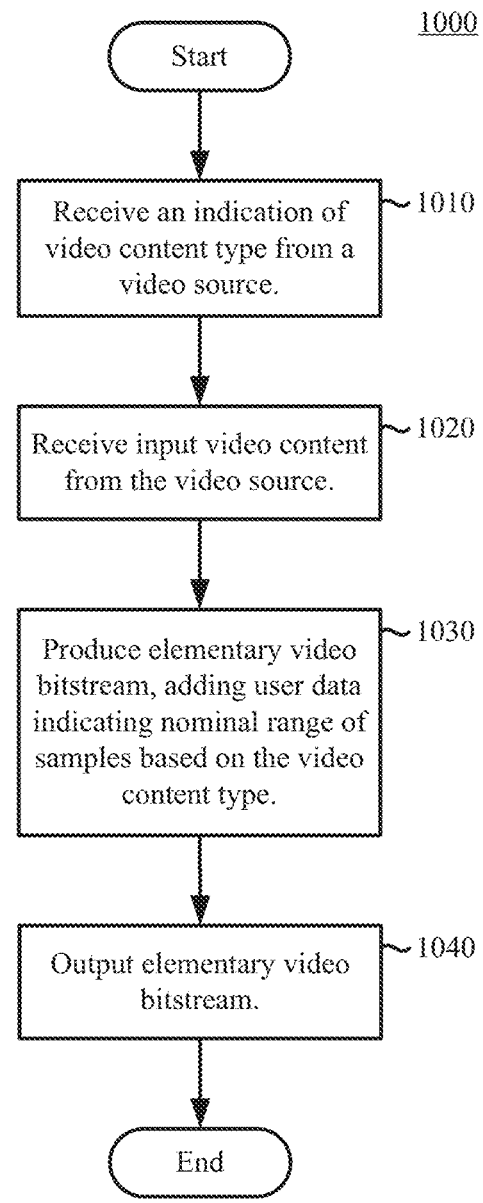

FIG. 10 shows an example technique (1000) for adding user data that indicates nominal range of samples of video content. A media encoder such as one described above with reference to FIG. 6, or other media encoder, performs the technique (1000).

The encoder receives (1010) an indication of video content type provided by a video source. For example, the video content type is YUV 0 . . . 255, YUV 48 . . . 208 or YUV 16 . . . 235. The encoder also receives (1020) input video content provided by the video source. The encoder produces (1030) an elementary video bitstream. In doing so, based on the video content type, the encoder adds user data indicating the nominal range of samples. The encoder outputs (1040) the user data and encoded media content as part of the elementary media bitstream.

Figure 11:
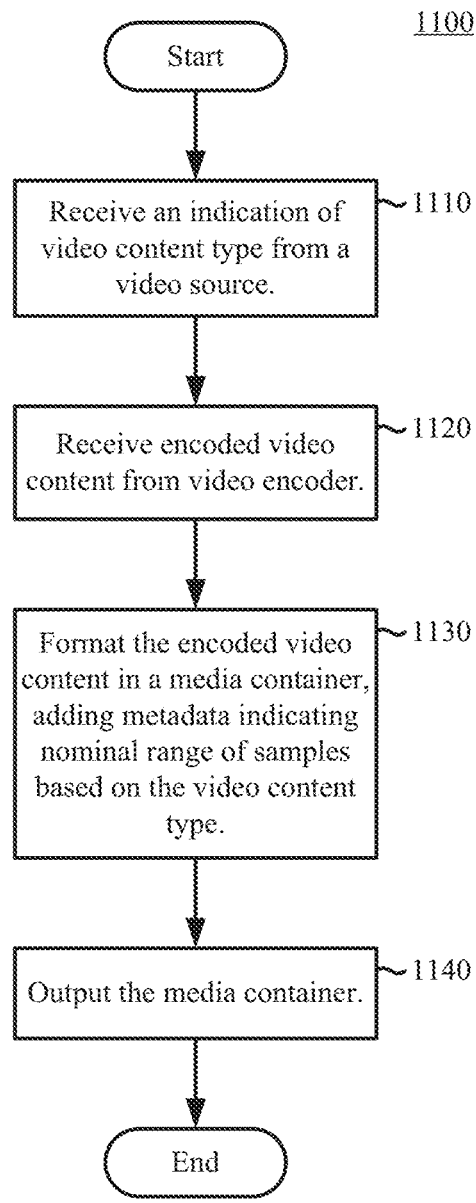

FIG. 11 shows an example technique (1100) for adding metadata that indicates nominal range of samples of video content. A container format sink tool such as one described above with reference to FIG. 3, or other container format sink tool, performs the technique (1100).

The container format sink tool receives (1110) an indication of video content type provided by a video source. For example, the video content type is YUV 0 . . . 255, YUV 48 . . . 208 or YUV 16 . . . 235. The container format sink tool also receives (1120) encoded video content provided by a video encoder. The container format sink tool formats (1130) the encoded video content in the media container. In doing so, based on the video content type, the container format sink tool adds metadata indicating the nominal range of samples. The container format sink tool then outputs (1140) the metadata and encoded media content as part of the media container.

VI. Techniques for Parsing and Using Custom Data that Indicates Nominal Range.

Figure 12:
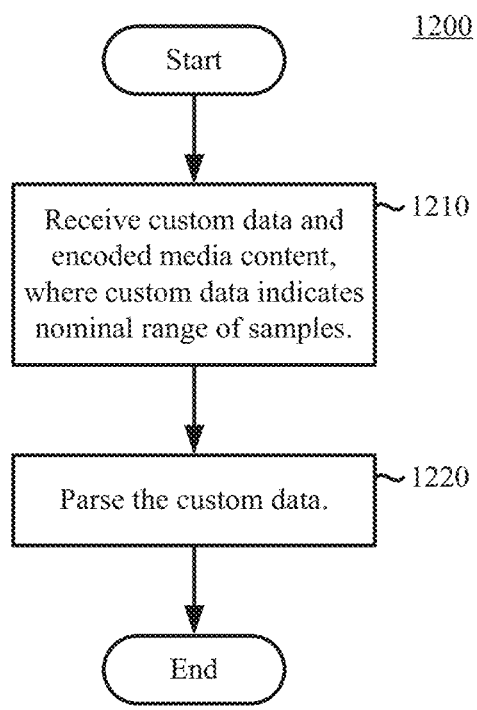
FIGS. 12-15 are flowcharts illustrating techniques for parsing and/or using custom data that indicates nominal range of samples of media content such as video content.

FIG. 12 shows a generalized technique (1200) for parsing custom data that indicates nominal range of samples of media content. A media decoder or container format source tool such as one described above with reference to FIG. 3 or 6, or other media processing tool, performs the technique (1200).

The media processing tool receives (1210) custom data and encoded media content. The custom data indicates nominal range of samples of the media content. For example, the custom data indicates the nominal range of samples is one of (a) full range characterized by values from $0 \ldots 2^n-1$ for samples of bit depth n, and (b) a limited range characterized by values in a sub-range of the full range. Alternatively, the custom data can expressly indicate the nominal range as end points of the range. Or, the custom data can indicate a selection among three, four, or more defined nominal ranges for the media content. The media processing tool parses (1220) the custom data.

The custom data that indicates the nominal range of samples can be signaled as one or more syntax elements in an elementary media bitstream that also includes syntax elements for the encoded media content, where backward compatibility and conformance with format of the elementary media bitstream are maintained. For example, the one or more syntax elements for the custom data are entry point user data or user data signaled at another level of bitstream syntax in the elementary media bitstream. In some implementations, the user data includes a GUID value that indicates the nominal range of samples. Alternatively, the user data is parameterized in another way.

Or, the custom data that indicates the nominal range of samples can be signaled as one or more fields in a media container that also includes the encoded media content, where backward compatibility and conformance with format of the media container are maintained. For example, the custom data is added in the media container as one or more fields of a metadata object or other object.

Figure 13:
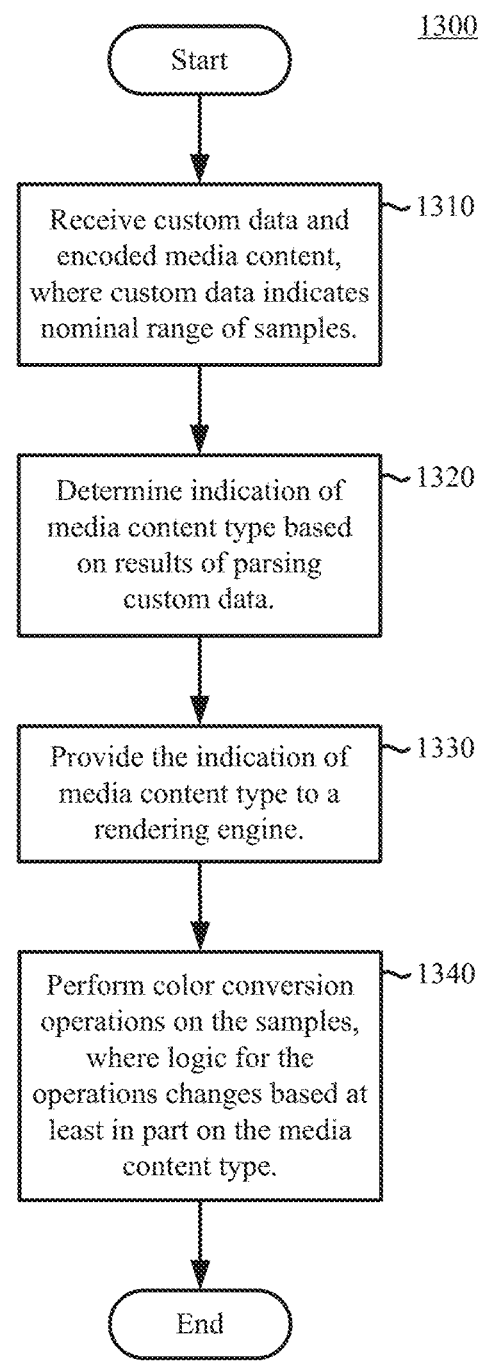

FIG. 13 shows an example technique (1300) for parsing and using custom data that indicates nominal range of samples of media content. A media decoder or container format source tool such as one described above with reference to FIG. 3 or 6, or other media processing tool, performs the technique (1300).

The media processing tool receives (1310) custom data and encoded media content. The custom data indicates nominal range of samples of the media content. The media processing tool determines (1320) an indication of media content type based on results of parsing of the custom data. The media processing tool provides (1330) the indication of media content type. A rendering engine can then perform (1340) color conversion operations on the samples, where logic for the color conversion operations changes based at least in part on the media content type.

Figure 14:
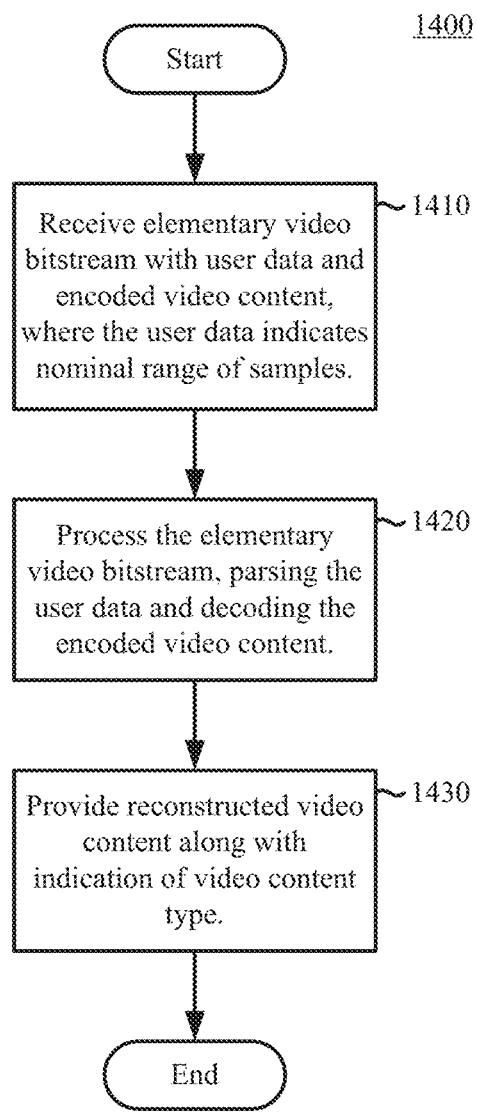

FIG. 14 shows an example technique (1400) for parsing user data that indicates nominal range of samples of video content. A media decoder such as one described above with reference to FIG. 6, or other media decoder, performs the technique (1400).

The decoder receives (1410) an elementary video bitstream that includes user data and encoded video content. The user data indicates nominal range of samples of the video content. The decoder processes (1420) the elementary video bitstream, parsing the user data and decoding the encoded video content. The decoder provides (1430) reconstructed video content along with an indication of video content type. For example, the decoder makes the reconstructed video content and the indication of video content type available to a rendering engine.

Figure 15:
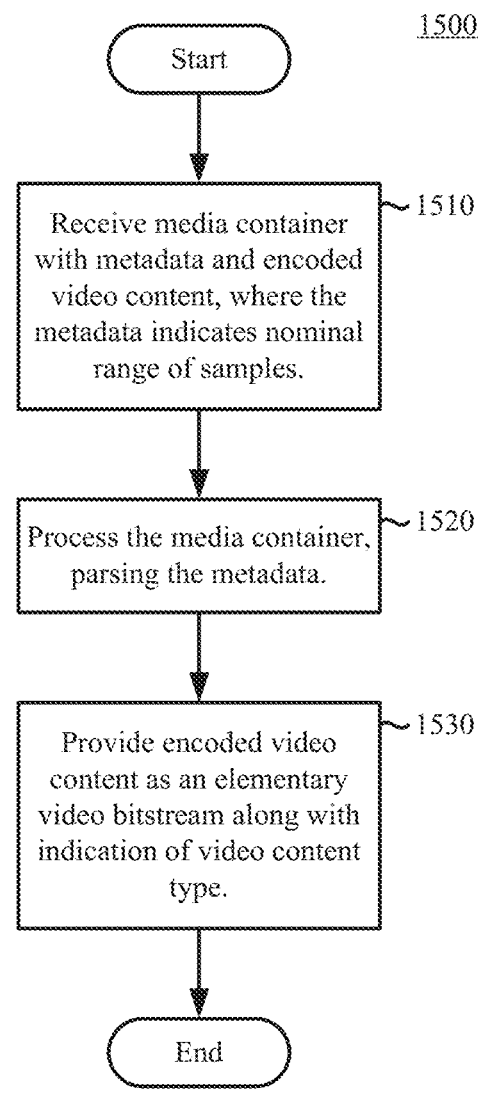

FIG. 15 shows an example technique (1500) for parsing metadata that indicates nominal range of samples of video content. A container format source tool such as one described above with reference to FIG. 3, or other container format source tool, performs the technique (1500).

The container format source tool receives (1510) a media container that includes metadata and encoded video content. The metadata indicates nominal range of samples of the video content. The container format source tool processes (1520) the media container, parsing the metadata. The container format source tool provides (1530) the encoded video content as an elementary video bitstream, along with an indication of video content type. For example, the container format source tool makes the encoded video content available to a video decoder and makes the indication of video content type available to a rendering engine.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. One or more non-transitory computer-readable media having stored thereon computer-executable instructions for causing one or more processing units, when programmed thereby, to perform media processing operations with a media processing tool, the media processing operations comprising:
   receiving custom data that indicates a nominal range of samples of part of encoded video content, wherein the custom data is signaled as (a) user data in an elementary video bitstream that also includes syntax elements for the part of the encoded video content or (b) one or more fields in a media container that also includes the part of the encoded video content;
   parsing the custom data, the samples of the part of the encoded video content having a sample depth that indicates an available range of values of the samples of the part of the encoded video content, wherein the nominal range is a range of values within the available range for the sample depth of the samples of the part of the encoded video content, and wherein the custom data indicates one of multiple possible options for the nominal range, the multiple possible options for the nominal range including:
   full range characterized by values from 0 . . . $2^n-1$ for samples of bit depth n; and
   a limited range characterized by values in less than the full range;
   receiving, for the part of the encoded video content, encoded data for one or more frames; and
   decoding the encoded data for the one or more frames to reconstruct the one or more frames, thereby producing samples of reconstructed output for the one or more frames.

2. The one or more computer-readable media of claim 1, wherein the custom data is signaled as the user data in the elementary video bitstream, the custom data being signaled as one or more syntax elements in the elementary video bitstream, and wherein backward compatibility and conformance with format of the elementary video bitstream are maintained.

3. The one or more computer-readable media of claim 2, wherein a globally unique identifier value in the one or more syntax elements for the custom data indicates the nominal range of the samples of the part of the encoded video content.

4. The one or more computer-readable media of claim 2, wherein the media processing tool is a video decoder configured to perform the receiving the custom data, the parsing the custom data, the receiving the encoded data, and the decoding the encoded data.

5. The one or more computer-readable media of claim 2, wherein the format of the elementary video bitstream is a variation of JPEG format.

6. The one or more computer-readable media of claim 1, wherein the custom data is signaled as the one or more fields in the media container, the media container also including the part of the encoded video content in the video elementary bitstream, and wherein backward compatibility and conformance with format of the media container are maintained.

7. The one or more computer-readable media of claim 6, wherein the one or more fields for the custom data in the media container are one or more fields of a metadata object.

8. The one or more computer-readable media of claim 6, wherein the media processing tool includes a container format source tool and a video decoder, the container format source tool being configured to perform the receiving the custom data and the parsing the custom data, and the video decoder being configured to perform the receiving the encoded data and the decoding the encoded data.

9. The one or more computer-readable media of claim 1, wherein the media processing operations further comprise:
converting the samples of the reconstructed output for the one or more frames from a first color space to a second color space different than the first color space, wherein the converting uses logic that changes depending at least in part on the nominal range.

10. The one or more computer-readable media of claim 9, wherein the logic also changes depending at least in part on characteristics of a transfer function applied to the samples of the reconstructed output for the one or more frames.

11. The one or more computer-readable media of claim 9, wherein, depending on the nominal range, the logic uses different coefficients for a matrix transform in the converting and/or uses different clipping in the converting.

12. A device comprising one or more processing units and a camera, wherein the device implements a media processing tool configured to perform media processing operations comprising:
receiving, from the camera, one or more frames of video;
encoding the one or more frames, thereby producing encoded data for part of encoded video content;
setting custom data that indicates a nominal range of samples of the part of the encoded video content, the samples of the part of the encoded video content having a sample depth that indicates an available range of values of the samples of the part of the encoded video content, wherein the nominal range is a range of values within the available range for the sample depth of the samples of the part of the encoded video content, and wherein the custom data indicates one of multiple possible options for the nominal range, the multiple possible options for the nominal range including:
full range characterized by values from $0 \ldots 2^n-1$ for samples of bit depth n; and
a limited range characterized by values in less than the full range;
signaling the custom data in association with the part of the encoded video content, wherein the custom data is signaled as (a) user data in an elementary video bitstream that also includes syntax elements for the part of the encoded video content or (b) one or more fields in a media container that also includes the part of the encoded video content; and
outputting the custom data and the part of the encoded video content.

13. The device of claim 12, wherein the custom data is signaled as the user data in the elementary video bitstream, the custom data being signaled as one or more syntax elements in the elementary video bitstream, and wherein backward compatibility and conformance with format of the elementary video bitstream are maintained.

14. The device of claim 13, wherein a globally unique identifier value in the one or more syntax elements for the custom data indicates the nominal range of the samples of the part of the encoded video content.

15. The device of claim 13, wherein the media processing tool is a video encoder configured to perform the encoding, the setting, the signaling, and the outputting.

16. The device of claim 13, wherein the format of the elementary video bitstream is a variation of JPEG format.

17. The device of claim 12, wherein the custom data is signaled as the one or more fields in the media container, the media container also including the part of the encoded video content in the video elementary bitstream, and wherein backward compatibility and conformance with format of the media container are maintained.

18. The device of claim 17, wherein the one or more fields for the custom data in the media container are one or more fields of a metadata object.

19. The device of claim 17, wherein the media processing tool includes a video encoder and a container format sink tool, the video encoder being configured to perform the encoding, and the container format sink tool being configured to perform the setting, the signaling, and the outputting.

20. One or more non-transitory computer-readable media having stored thereon custom data and part of encoded video content, wherein the custom data indicates a nominal range of samples of the part of the encoded video content, wherein the custom data is signaled as (a) user data in an elementary video bitstream that also includes syntax elements for the part of the encoded video content or (b) one or more fields in a media container that also includes the part of the encoded video content, the custom data and the part of the encoded video content having been produced with a media processing tool by media processing operations comprising:
encoding one or more frames of video, thereby producing encoded data for the part of the encoded video content;
setting the custom data, the samples of the part of the encoded video content having a sample depth that indicates an available range of values of the samples of the part of the encoded video content, wherein the nominal range is a range of values within the available range for the sample depth of the samples of the part of the encoded video content, and wherein the custom data indicates one of multiple possible options for the nominal range, the multiple possible options for the nominal range including:
full range characterized by values from $0 \ldots 2^n-1$ for samples of bit depth n; and
a limited range characterized by values in less than the full range; and
signaling the custom data in association with the part of the encoded video content.

* * * * *